United States Patent
Uchida et al.

(10) Patent No.: US 8,537,471 B2
(45) Date of Patent: Sep. 17, 2013

(54) ZOOM LENS SYSTEM, INTERCHANGEABLE LENS APPARATUS AND CAMERA SYSTEM

(75) Inventors: Tsuneo Uchida, Chiba (JP); Koji Hoshi, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 163 days.

(21) Appl. No.: 13/183,455

(22) Filed: Jul. 15, 2011

(65) Prior Publication Data
US 2012/0026602 A1 Feb. 2, 2012

(30) Foreign Application Priority Data

Aug. 2, 2010 (JP) ................................. 2010-173360
Jun. 2, 2011 (JP) ................................. 2011-124620

(51) Int. Cl.
*G02B 15/14* (2006.01)
(52) U.S. Cl.
USPC ........................................ 359/684; 359/676
(58) Field of Classification Search
CPC ........ G02B 15/00; G02B 15/15; G02B 15/14; G02B 15/16; G02B 15/22
USPC .................................. 359/676–692
See application file for complete search history.

(56) References Cited

U.S. PATENT DOCUMENTS 5,638,210 A * 6/1997 Sato et al. ..................... 359/557
2011/0205636 A1* 8/2011 Ito ................................. 359/684

FOREIGN PATENT DOCUMENTS

| JP | 2002-296502 A | 10/2002 |
|----|---------------|---------|
| JP | 2008-134334 A | 6/2008 |
| JP | 2009-157067 A | 7/2009 |
| JP | 2009-244445 A | 10/2009 |
| JP | 2009-265652 A | 11/2009 |
| JP | 2009-265653 A | 11/2009 |
| JP | 2009-265654 A | 11/2009 |
| JP | 2009-265655 A | 11/2009 |
| JP | 2009-265656 A | 11/2009 |
| JP | 2009-265657 A | 11/2009 |
| WO | 2007-010822 A1 | 1/2007 |
| WO | 2007-010862 A1 | 1/2007 |

* cited by examiner

Primary Examiner — Darryl J Collins
(74) Attorney, Agent, or Firm — Judge Patent Associates

(57) ABSTRACT

A zoom lens system, in order from an object side to an image side, comprising a front unit and a rear unit, wherein the rear unit, in order from the object side to the image side, comprises: a subsequent first lens unit and a subsequent second lens unit having negative optical power and being a focusing lens unit which moves along an optical axis at the time of focusing from an infinity in-focus condition to a close-object in-focus condition, the subsequent first lens unit comprises a first-N sub lens unit having negative optical power and a first-P sub lens unit having positive optical power, and the first-N sub lens unit or the first-P sub lens unit is an image blur compensating lens unit which moves in a direction perpendicular to the optical axis in order to optically compensate image blur; an interchangeable lens apparatus; and a camera system are provided.

12 Claims, 10 Drawing Sheets

ZOOM LENS SYSTEM, INTERCHANGEABLE LENS APPARATUS AND CAMERA SYSTEM

CROSS-REFERENCE TO RELATED APPLICATION

This application is based on application No. 2010-173360 filed in Japan on Aug. 2, 2010 and application No. 2011-124620 filed in Japan on Jun. 2, 2011, the contents of which are hereby incorporated by reference.

BACKGROUND OF THE INVENTION

1. Field of the Invention

The present invention relates to a zoom lens system, an interchangeable lens apparatus, and a camera system. In particular, the present invention relates to: a zoom lens system which is suitable as an imaging lens system in, so-called, an interchangeable-lens type digital camera system; and an interchangeable lens apparatus and a camera system each employing this zoom lens system.

2. Description of the Background Art

In recent years, interchangeable-lens type digital camera systems have been spreading rapidly. Such interchangeable-lens type digital camera systems (also referred to simply as "camera systems", hereinafter) include: a camera body having an image sensor such as a CCD (Charge Coupled Device), a CMOS (Complementary Metal-Oxide Semiconductor) or the like; and an interchangeable lens apparatus having an imaging lens system for forming an optical image on a light receiving surface of the image sensor.

Such interchangeable-lens type digital camera systems are able to take a high-sensitive and high-quality image because an image sensor used in the interchangeable-lens type digital camera systems is larger than that equipped for a compact type digital camera. In addition, the interchangeable-lens type digital camera systems can realize: high-speed focusing and high-speed image processing after image taking; and easy replacement of an interchangeable lens apparatus in accordance with a desired scene. Furthermore, an interchangeable lens apparatus having a zoom lens system that forms an optical image with variable magnification is popular because it allows free change of focal length without the necessity of lens replacement. Accordingly, for some time, various kinds of zoom lens systems have been proposed, which can be utilized as an imaging lens system in the interchangeable-lens type digital camera systems, such as a zoom lens system disclosed in each of Japanese Laid-Open Patent Publications No. 2009-265652, No. 2009-265653, No. 2009-265654, No. 2009-265655, No. 2009-265656, No. 2009-265657, No. 2009-244445 and No. 2002-296502, International Publications WO 2007/010862 and WO 2007/010822, and Japanese Laid-Open Patent Publications No. 2009-157067 and No. 2008-134334.

Although the interchangeable-lens type digital camera systems show the above-mentioned various kinds of merits, the size and the weight of such interchangeable-lens type digital camera systems are greater than those of a compact type digital camera. It is preferable that the size and the weight of the interchangeable-lens type digital camera systems are as small as possible for easy carrying around and handling. Accordingly, a most compact and lightweight possible zoom lens system with maintaining imaging performance is desired as a zoom lens system to be used in the interchangeable-lens type digital camera systems.

SUMMARY OF THE INVENTION

One object of the present invention is to provide a compact and lightweight zoom lens system having excellent imaging performance, which can be suitably used in an interchangeable-lens type digital camera system. Another object of the present invention is to provide compact and lightweight interchangeable lens apparatus and camera system.

The novel concepts disclosed herein were achieved in order to solve the foregoing problems in the conventional art, and herein is disclosed:

a zoom lens system having a plurality of lens units, each lens unit being composed of at least one lens element, the zoom lens system, in order from an object side to an image side, comprising:

a front unit; and
a rear unit, wherein
the rear unit, in order from the object side to the image side, comprises:
a subsequent first lens unit; and
a subsequent second lens unit having negative optical power and being a focusing lens unit which moves along an optical axis at the time of focusing from an infinity in-focus condition to a close-object in-focus condition,
the subsequent first lens unit comprises:
a first-N sub lens unit having negative optical power; and
a first-P sub lens unit having positive optical power, and
the first-N sub lens unit or the first-P sub lens unit is an image blur compensating lens unit which moves in a direction perpendicular to the optical axis in order to optically compensate image blur.

The novel concepts disclosed herein were achieved in order to solve the foregoing problems in the conventional art, and herein is disclosed:

an interchangeable lens apparatus comprising:
a zoom lens system; and
a lens mount section which is connectable to a camera body including an image sensor for receiving an optical image formed by the zoom lens system and converting the optical image into an electric image signal; wherein
the zoom lens system, having a plurality of lens units, each lens unit being composed of at least one lens element, in order from an object side to an image side, comprises:
a front unit; and
a rear unit, wherein
the rear unit, in order from the object side to the image side, comprises:
a subsequent first lens unit; and
a subsequent second lens unit having negative optical power and being a focusing lens unit which moves along an optical axis at the time of focusing from an infinity in-focus condition to a close-object in-focus condition,
the subsequent first lens unit comprises:
a first-N sub lens unit having negative optical power; and
a first-P sub lens unit having positive optical power, and
the first-N sub lens unit or the first-P sub lens unit is an image blur compensating lens unit which moves in a direction perpendicular to the optical axis in order to optically compensate image blur.

The novel concepts disclosed herein were achieved in order to solve the foregoing problems in the conventional art, and herein is disclosed:

a camera system comprising:
an interchangeable lens apparatus including a zoom lens system; and
a camera body which is detachably connected to the interchangeable lens apparatus via a camera mount section, and includes an image sensor for receiving an optical image formed by the zoom lens system and converting the optical image into an electric image signal; wherein the zoom lens system, having a plurality of lens units, each lens unit being composed of at least one lens element, in order from an object side to an image side, comprises:

a front unit; and a rear unit, wherein the rear unit, in order from the object side to the image side, comprises:

a subsequent first lens unit; and a subsequent second lens unit having negative optical power and being a focusing lens unit which moves along an optical axis at the time of focusing from an infinity in-focus condition to a close-object in-focus condition, the subsequent first lens unit comprises:

a first-N sub lens unit having negative optical power; and a first-P sub lens unit having positive optical power, and the first-N sub lens unit or the first-P sub lens unit is an image blur compensating lens unit which moves in a direction perpendicular to the optical axis in order to optically compensate image blur.

According to the present invention, it is possible to provide: a compact and lightweight zoom lens system having excellent imaging performance; and an interchangeable lens apparatus and a camera system each employing this zoom lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
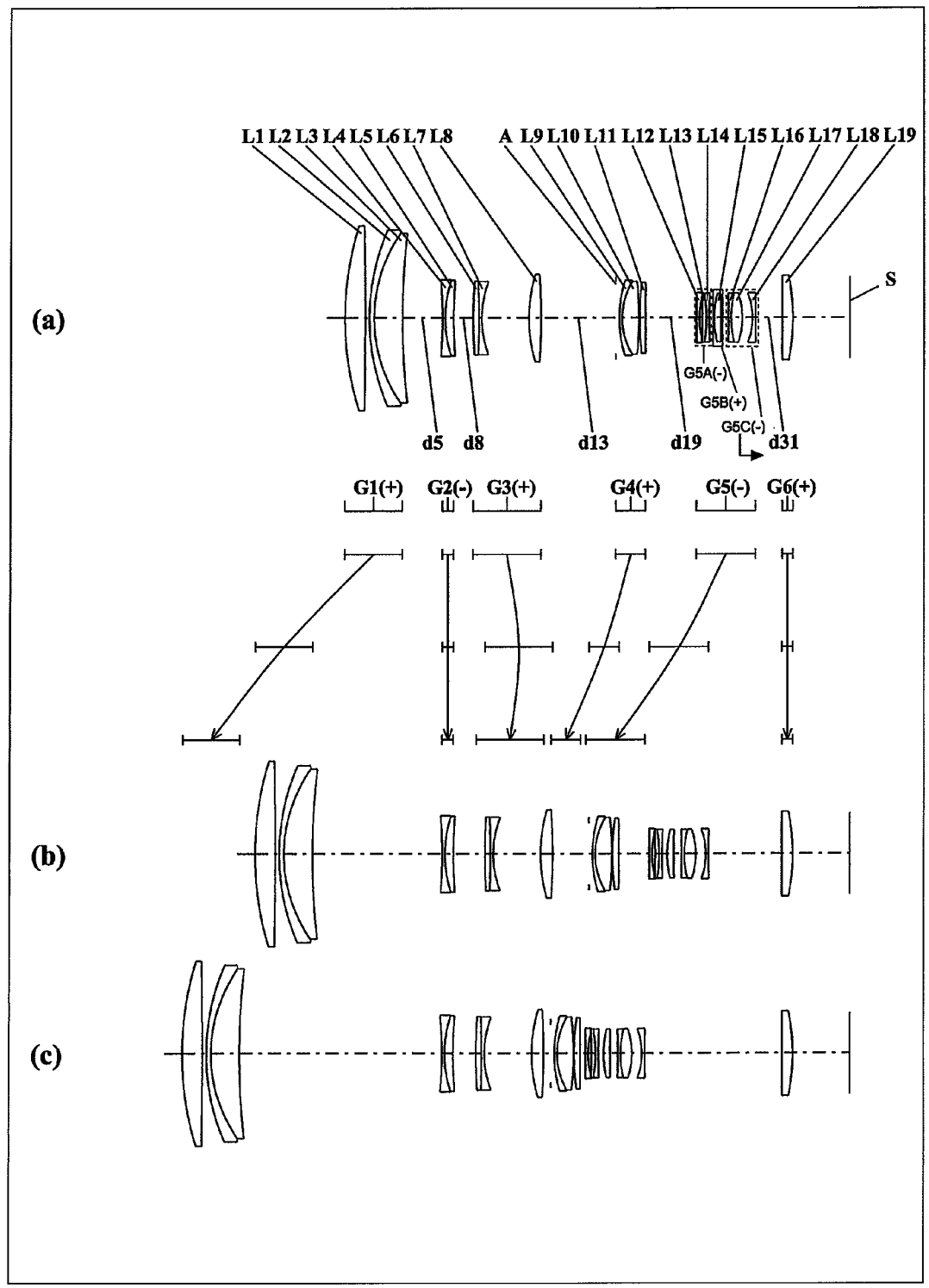
FIG. 1 is a lens arrangement diagram showing an infinity in-focus condition of a zoom lens system according to Embodiment 1 (Example 1)
Figure 4:
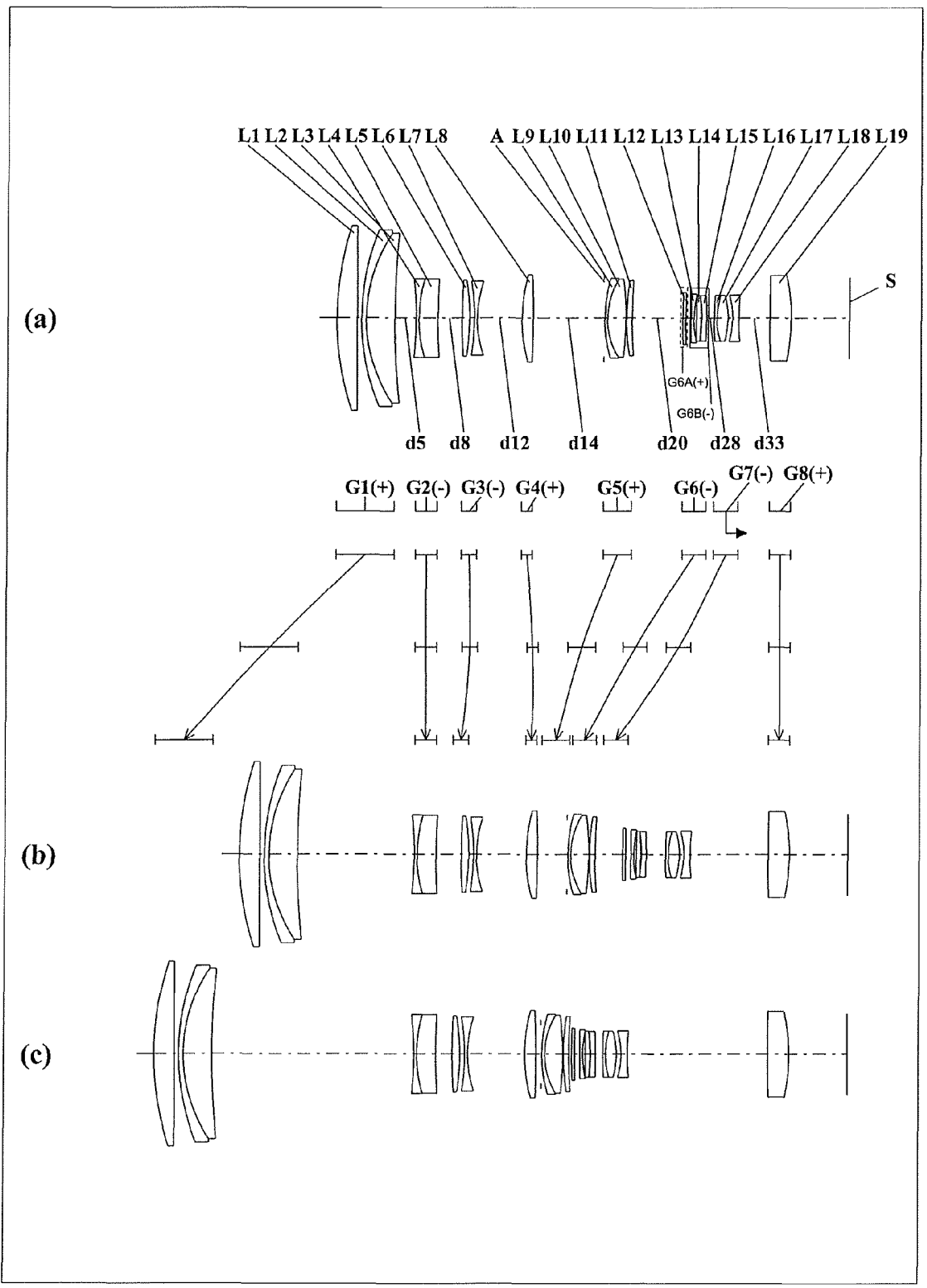
FIG. 4 is a lens arrangement diagram showing an infinity in-focus condition of a zoom lens system according to Embodiment 2 (Example 2)
Figure 7:
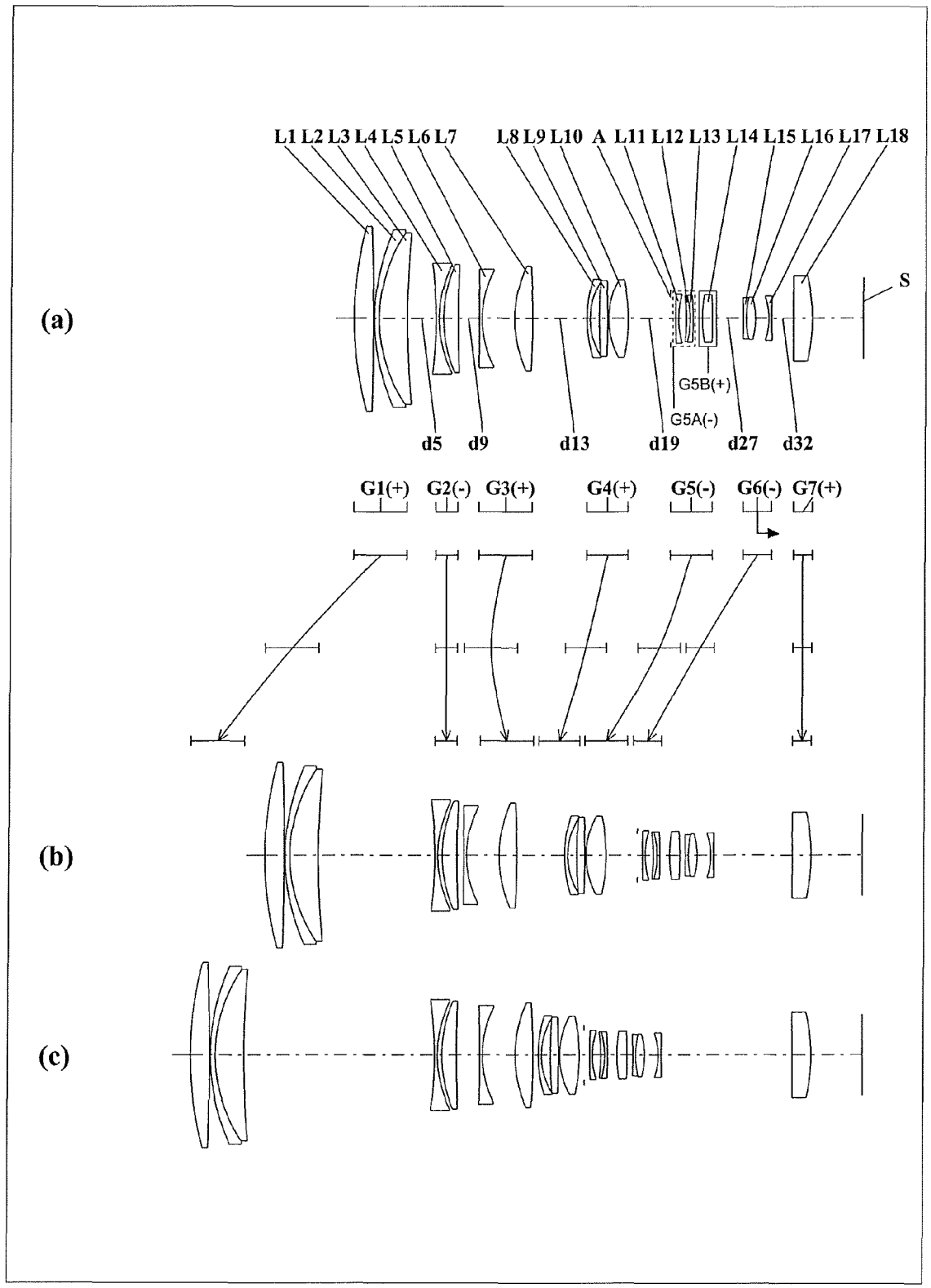
FIG. 7 is a lens arrangement diagram showing an infinity in-focus condition of a zoom lens system according to Embodiment 3 (Example 3)

FIGS. 1, 4, and 7 are lens arrangement diagrams of zoom lens systems according to Embodiments 1, 2, and 3, respectively. Each Figure shows a zoom lens system in an infinity in-focus condition.

In each Figure, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Figure, an arrow of straight or curved line provided between part (a) and part (b) indicates the movement of each lens unit from a wide-angle limit through a middle position to a telephoto limit. Moreover, in each Figure, an arrow imparted to a lens unit indicates focusing from an infinity in-focus condition to a close-object in-focus condition. That is, the arrow indicates the moving direction at the time of focusing from an infinity in-focus condition to a close-object in-focus condition.

In each Figure, symbol (+) or (−) imparted to the symbol of each lens unit corresponds to the sign of the optical power of the lens unit. In each Figure, the straight line located on the most right-hand side indicates the position of the image surface S. As shown in FIG. 1, an aperture diaphragm A is provided within a fourth lens unit G4. Further, as shown in FIGS. 4 and 7, an aperture diaphragm A is provided within a fifth lens unit G5.

Embodiment 1

The zoom lens system according to Embodiment 1, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, and a sixth lens unit G6 having positive optical power.

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a bi-concave fourth lens element L4; and a positive meniscus fifth lens element L5 with the convex surface facing the object side. The fourth lens element L4 and the fifth lens element L5 are cemented with each other.

The third lens unit G3, in order from the object side to the image side, comprises: a bi-convex sixth lens element L6; a bi-concave seventh lens element L7; and a bi-convex eighth lens element L8. The sixth lens element L6 and the seventh lens element L7 are cemented with each other.

The fourth lens unit G4, in order from the object side to the image side, comprises: an aperture diaphragm A; a negative meniscus ninth lens element L9 with the convex surface facing the object side; a bi-convex tenth lens element L10; and a bi-convex eleventh lens element L11. The ninth lens element L9 and the tenth lens element L10 are cemented with each other.

The fifth lens unit G5, in order from the object side to the image side, comprises: a planer-concave twelfth lens element L12 with the concave surface facing the image side; a positive meniscus thirteenth lens element L13 with the convex surface facing the image side; a bi-concave fourteenth lens element L14; a positive meniscus fifteenth lens element L15 with the convex surface facing the object side; a bi-concave sixteenth lens element L16; a bi-convex seventeenth lens element L17; and a bi-concave eighteenth lens element L18. The thirteenth lens element L13 and the fourteenth lens element L14 are cemented with each other, and the sixteenth lens element L16 and the seventeenth lens element L17 are cemented with each other.

The sixth lens unit G6 comprises solely a planer-convex nineteenth lens element L19 with the convex surface facing the image side.

In the zoom lens system according to Embodiment 1, at the time of zooming from a wide-angle limit to a telephoto limit, each of the first lens unit G1, the third lens unit G3, the fourth lens unit G4 and the fifth lens unit G5 moves along the optical axis so that the interval between the first lens unit G1 and the second lens unit G2 is longer at a telephoto limit than at a wide-angle limit, the interval between the second lens unit G2 and the third lens unit G3 is longer at a telephoto limit than at a wide-angle limit, the interval between the third lens unit G3 and the fourth lens unit G4 is shorter at a telephoto limit than at a wide-angle limit, the interval between the fourth lens unit G4 and the fifth lens unit G5 is shorter at a telephoto limit than at a wide-angle limit, and the interval between the fifth lens unit G5 and the sixth lens unit G6 is longer at a telephoto limit than at a wide-angle limit. At the time of zooming, the second lens unit G2 and the sixth lens unit G6 are fixed relative to the image surface S. The aperture diaphragm A moves together with the fourth lens unit G4 along the optical axis.

In the zoom lens system according to Embodiment 1, the fifth lens unit G5, in order from the object side to the image side, consists of: a sub lens unit G5A having negative optical power (the twelfth lens element L12, the thirteenth lens element L13 and the fourteenth lens element L14); a sub lens unit G5B having positive optical power (the fifteenth lens element L15); and a sub lens unit G5C having negative optical power (the sixteenth lens element L16, the seventeenth lens element L17 and the eighteenth lens element L18). Here, in a case that a lens unit is composed of a plurality of lens elements, the sub lens unit indicates any one lens element included in the lens unit or alternatively a combination of a plurality of adjacent lens elements among the plurality of lens elements included in the lens unit. At the time of zooming from a wide-angle limit to a telephoto limit, the interval between the sub lens unit G5A and the sub lens unit G5B does not vary, and the interval between the sub lens unit G5B and the sub lens unit G5C also does not vary.

In the zoom lens system according to Embodiment 1, the sub lens unit G5A (a first-N sub lens unit) is moved in a direction perpendicular to the optical axis in order to optically compensate image blur caused by vibration of an optical system. Because a lens unit which is located on the image side relative to the aperture diaphragm A and has negative optical power is an image blur compensating lens unit, the lens diameter of the lens unit can be reduced. It is preferable that the sub lens unit G5A is composed of at least two lens elements. In this case, lean of the image surface at a wide-angle limit can be suitably maintained along with suitable compensation of chromatic aberration at a telephoto limit during image blur compensation. In addition, when at least one lens unit having positive optical power is arranged on the image side relative to the image blur compensating lens unit, excellent optical performance during image blur compensation can be maintained.

The sub lens unit G5B having positive optical power can be moved in a direction perpendicular to the optical axis in order to compensate image blur, instead of the sub lens unit G5A having negative optical power. In this case, the outer diameter of a lens barrel can be reduced by downsizing an image blue compensation system along with reduction in the weight of the image blur compensating lens unit. In addition, it is more preferable that the sub lens unit G5B is composed of a cemented lens element prepared by cementing two lens elements with each other when the sub lens unit G5B is utilized for image blur compensation. In this case, chromatic aberration during image blur compensation can be suitably maintained.

In the zoom lens system according to Embodiment 1, the sub lens unit G5C (a subsequent second lens unit) moves to the image side along the optical axis at the time of focusing from an infinity in-focus condition to a close-object in-focus condition. In the zoom lens system according to Embodiment 1, chromatic aberration at a telephoto limit can be suitably compensated during focusing because the sub lens unit G5C is composed of at least two lens elements. In addition, the weight and the lens diameter of the sub lens unit G5C can be reduced because the sub lens unit G5C which is a focusing lens unit is located on the image side relative to the aperture diaphragm A and has negative optical power. As a result, the outer diameter of a lens barrel can be reduced.

Embodiment 2

The zoom lens system according to Embodiment 2, in order from the object side to the image side, comprises a first lens unit G1 having positive optical power, a second lens unit G2 having negative optical power, a third lens unit G3 having negative optical power, a fourth lens unit G4 having positive optical power, a fifth lens unit G5 having positive optical power, a sixth lens unit G6 having negative optical power, a seventh lens unit G7 having negative optical power, and a eighth lens unit G8 having positive optical power.

The first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a bi-concave fourth lens element L4; and a positive meniscus fifth lens element L5 with the convex surface facing the object side. The fourth lens element L4 and the fifth lens element L5 are cemented with each other.

The third lens unit G3, in order from the object side to the image side, comprises: a bi-convex sixth lens element L6; and a bi-concave seventh lens element L7.

The fourth lens unit G4 comprises solely a bi-convex eighth lens element L8.

The fifth lens unit G5, in order from the object side to the image side, comprises: an aperture diaphragm A; a negative meniscus ninth lens element L9 with the convex surface facing the object side; a bi-convex tenth lens element L10; and a positive meniscus eleventh lens element L11 with the convex surface facing the object side. The ninth lens element L9 and the tenth lens element L10 are cemented with each other.

The sixth lens unit G6, in order from the object side to the image side, comprises: a positive meniscus twelfth lens element L12 with the convex surface facing the object side; a planer-concave thirteenth lens element L13 with the concave surface facing the image side; a bi-convex fourteenth lens element L14; and a negative meniscus fifteenth lens element L15 with the convex surface facing the image side.

The seventh lens unit G7, in order from the object side to the image side, comprises: a negative meniscus sixteenth lens element L16 with the convex surface facing the object side; a bi-convex seventeenth lens element L17; and a bi-concave eighteenth lens element L18. The sixteenth lens element L16 and the seventeenth lens element L17 are cemented with each other.

The eighth lens unit G8 comprises solely a bi-convex nineteenth lens element L19.

In the zoom lens system according to Embodiment 2, at the time of zooming from a wide-angle limit to a telephoto limit, each of the first lens unit G1, the third lens unit G3, the fourth lens unit G4, the fifth lens unit G5, the sixth lens unit G6 and the seventh lens unit G7 moves along the optical axis so that the interval between the first lens unit G1 and the second lens unit G2 is longer at a telephoto limit than at a wide-angle limit, the interval between the second lens unit G2 and the third lens unit G3 is shorter at a telephoto limit than at a wide-angle limit, the interval between the third lens unit G3 and the fourth lens unit G4 is longer at a telephoto limit than at a wide-angle limit, the interval between the fourth lens unit G4 and the fifth lens unit G5 is shorter at a telephoto limit than at a wide-angle limit, the interval between the fifth lens unit G5 and the sixth lens unit G6 is shorter at a telephoto limit than at a wide-angle limit, the interval between the sixth lens unit G6 and the seventh lens unit G7 is shorter at a telephoto limit than at a wide-angle limit, and the interval between the seventh lens unit G7 and the eighth lens unit G8 is longer at a telephoto limit than at a wide-angle limit. At the time of zooming, the second lens unit G2 and the eighth lens unit G8 are fixed relative to the image surface S. The aperture diaphragm A moves together with the fifth lens unit G5 along the optical axis.

In the zoom lens system according to Embodiment 2, the sixth lens unit G6, in order from the object side to the image side, consists of: a sub lens unit G6A having positive optical power (the twelfth lens element L12); and a sub lens unit G6B having negative optical power (the thirteenth lens element L13, the fourteenth lens element L14 and the fifteenth lens element L15). Moreover, the seventh lens unit G7 having negative optical power is arranged just on the image side relative to the sub lens unit G6B. At the time of zooming from a wide-angle limit to a telephoto limit, the interval between the sub lens unit G6A and the sub lens unit G6B does not vary, while the interval between the sub lens unit G6B and the seventh lens unit G7 varies.

In the zoom lens system according to Embodiment 2, the sub lens unit G6B (a first-N sub lens unit) is moved in a direction perpendicular to the optical axis in order to optically compensate image blur caused by vibration of an optical system. Because a lens unit which is located on the image side relative to the aperture diaphragm A and has negative optical power is an image blur compensating lens unit, the lens diameter of the lens unit can be reduced. It is preferable that the sub lens unit G6B is composed of at least two lens elements. In this case, lean of the image surface at a wide-angle limit can be suitably maintained along with suitable compensation of chromatic aberration at a telephoto limit during image blur compensation. In addition, when at least one lens unit having positive optical power is arranged on the image side relative to the image blur compensating lens unit, excellent optical performance during image blur compensation can be maintained.

The sub lens unit G6A having positive optical power can be moved in a direction perpendicular to the optical axis in order to compensate image blur, instead of the sub lens unit G6B having negative optical power. In this case, the outer diameter of a lens barrel can be reduced by downsizing an image blue compensation system along with reduction in the weight of the image blur compensating lens unit. In addition, it is more preferable that the sub lens unit G6A is composed of a cemented lens element prepared by cementing two lens elements with each other when the sub lens unit G6A is utilized for image blur compensation. In this case, chromatic aberration during image blur compensation can be suitably maintained.

In the zoom lens system according to Embodiment 2, the seventh lens unit G7 (a subsequent second lens unit) moves to the image side along the optical axis at the time of focusing from an infinity in-focus condition to a close-object in-focus condition. In the zoom lens system according to Embodiment 2, chromatic aberration at a telephoto limit can be suitably compensated during focusing because the seventh lens unit G7 is composed of at least two lens elements. In addition, the weight and the lens diameter of the seventh lens unit G7 can be reduced because the seventh lens unit G7 which is a focusing lens unit is located on the image side relative to the aperture diaphragm A and has negative optical power. As a result, the outer diameter of a lens barrel can be reduced.

Embodiment 3

The zoom lens system according to Embodiment 3, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, a sixth lens unit G6 having negative optical power, and a seventh lens unit G7 having positive optical power.

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a bi-concave fourth lens element L4; and a positive meniscus fifth lens element L5 with the convex surface facing the object side.

The third lens unit G3, in order from the object side to the image side, comprises: a bi-concave sixth lens element L6; and a bi-convex seventh lens element L7.

The fourth lens unit G4, in order from the object side to the image side, comprises: a negative meniscus eighth lens element L8 with the convex surface facing the object side; a bi-convex ninth lens element L9; and a bi-convex tenth lens element L10.

The fifth lens unit G5, in order from the object side to the image side, comprises: an aperture diaphragm A; a negative meniscus eleventh lens element L11 with the convex surface facing the object side; a positive meniscus twelfth lens element L12 with the convex surface facing the image side; a negative meniscus thirteenth lens element L13 with the convex surface facing the image side; and a bi-convex fourteenth lens element L14. The twelfth lens element L12 and the thirteenth lens element L13 are cemented with each other.

The sixth lens unit G6, in order from the object side to the image side, comprises: a bi-concave fifteenth lens element L15; a bi-convex sixteenth lens element L16; and a bi-concave seventeenth lens element L17. The fifteenth lens element L15 and the sixteenth lens element L16 are cemented with each other.

The seventh lens unit G7 comprises solely a positive meniscus eighteenth lens element L18 with the convex surface facing the image side.

In the zoom lens system according to Embodiment 3, at the time of zooming from a wide-angle limit to a telephoto limit, each of the first lens unit G1, the third lens unit G3, the fourth lens unit G4, the fifth lens unit G5 and the sixth lens unit G6 moves along the optical axis so that the interval between the first lens unit G1 and the second lens unit G2 is longer at a telephoto limit than at a wide-angle limit, the interval between the second lens unit G2 and the third lens unit G3 is longer at a telephoto limit than at a wide-angle limit, the interval between the third lens unit G3 and the fourth lens unit G4 is shorter at a telephoto limit than at a wide-angle limit, the interval between the fourth lens unit G4 and the fifth lens unit G5 is shorter at a telephoto limit than at a wide-angle limit, the interval between the fifth lens unit G5 and the sixth lens unit G6 is shorter at a telephoto limit than at a wide-angle limit, and the interval between the sixth lens unit G6 and the seventh lens unit G7 is longer at a telephoto limit than at a wide-angle limit. At the time of zooming, the second lens unit G2 and the seventh lens unit G7 are fixed relative to the image surface S. The aperture diaphragm A moves together with the fifth lens unit G5 along the optical axis.

In the zoom lens system according to Embodiment 3, the fifth lens unit G5, in order from the object side to the image side, consists of: a sub lens unit G5A having negative optical power (the eleventh lens element L11, the twelfth lens element L12 and the thirteenth lens element L13); and a sub lens unit G5B having positive optical power (the fourteenth lens element L14). Moreover, the sixth lens unit G6 having negative optical power is arranged just on the image side relative to the sub lens unit G5B. At the time of zooming from a wide-angle limit to a telephoto limit, the interval between the sub lens unit G5A and the sub lens unit G5B does not vary, while the interval between the sub lens unit G5B and the sixth lens unit G6 varies.

In the zoom lens system according to Embodiment 3, the sub lens unit G5A (a first-N sub lens unit) is moved in a direction perpendicular to the optical axis in order to optically compensate image blur caused by vibration of an optical system. Because a lens unit which is located on the image side relative to the aperture diaphragm A and has negative optical power is an image blur compensating lens unit, the lens diameter of the lens unit can be reduced. It is preferable that the sub lens unit G5A is composed of at least two lens elements. In this case, lean of the image surface at a wide-angle limit can be suitably maintained along with suitable compensation of chromatic aberration at a telephoto limit during image blur compensation. In addition, when at least one lens unit having positive optical power is arranged on the image side relative to the image blur compensating lens unit, excellent optical performance during image blur compensation can be maintained.

The sub lens unit G5B having positive optical power can be moved in a direction perpendicular to the optical axis in order to compensate image blur, instead of the sub lens unit G5A having negative optical power. In this case, the outer diameter of a lens barrel can be reduced by downsizing an image blue compensation system along with reduction in the weight of the image blur compensating lens unit. In addition, it is more preferable that the sub lens unit G5B is composed of a cemented lens element prepared by cementing two lens elements with each other when the sub lens unit G5B is utilized for image blur compensation. In this case, chromatic aberration during image blur compensation can be suitably maintained.

In the zoom lens system according to Embodiment 3, the sixth lens unit G6 (a subsequent second lens unit) moves to the image side along the optical axis at the time of focusing from an infinity in-focus condition to a close-object in-focus condition. In the zoom lens system according to Embodiment 3, chromatic aberration at a telephoto limit can be suitably compensated during focusing because the sixth lens unit G6 is composed of at least two lens elements. In addition, the weight and the lens diameter of the sixth lens unit G6 can be reduced because the sixth lens unit G6 which is a focusing lens unit is located on the image side relative to the aperture diaphragm A and has negative optical power. As a result, the outer diameter of a lens barrel can be reduced.

Like in the zoom lens system according to each of Embodiments 1 to 3, it is preferable that the first lens unit G1 moves along the optical axis at the time of zooming from a wide-angle limit to a telephoto limit. In a case that the first lens unit G1 is a movable unit, the height of a light beam to following lens units can be reduced. As a result, the following lens units can be downsized, and the size and the weight of a focusing lens unit in a zoom lens system which adopts an inner-focus method can be reduced.

Like in the zoom lens system according to each of Embodiments 1 to 3, it is preferable that at least one lens unit having positive optical power is arranged on the image side relative to the focusing lens unit. In this case, excellent optical performance at a close-object in-focus condition can be maintained. In addition, increase in the angle of incident light to an imaging surface can be suppressed.

The following description is given for conditions preferred to be satisfied by a zoom lens system like the zoom lens systems according to Embodiments 1 to 3. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, a zoom lens system like the zoom lens systems according to Embodiments 1 to 3, which has a plurality of lens units, each lens unit being composed of at least one lens element, the zoom lens system, in order from an object side to an image side, comprises a front unit and a rear unit, wherein the rear unit, in order from the object side to the image side, comprises a subsequent first lens unit and a subsequent second lens unit having negative optical power and being a focusing lens unit which moves along an optical axis at the time of focusing from an infinity in-focus condition to a close-object in-focus condition, and the subsequent first lens unit comprises a first-N sub lens unit having negative optical power and a first-P sub lens unit having positive optical power, and the first-N sub lens unit or the first-P sub lens unit is an image blur compensating lens unit which moves in a direction perpendicular to the optical axis in order to optically compensate image blur (this lens configuration is referred to as a basic configuration of the embodiments, hereinafter), preferably satisfies the following condition (1).

$$0.2 < |f_{FR1}/f_W| < 1.2 \tag{1}$$

where $f_{FR1}$ is a focal length of the subsequent first lens unit, and
$f_W$ is a focal length of the entire system at a wide-angle limit.

The condition (1) sets forth the ratio of the focal length of the subsequent first lens unit to the focal length of the entire system at a wide-angle limit. When the condition (1) is satisfied, the amount of movement of the focusing lens unit at the time of focusing from an infinity in-focus condition to a close-object in-focus condition can be reduced with maintaining short overall length of zoom lens system. When the value exceeds the upper limit of the condition (1), although the amount of movement of the focusing lens unit at the time of focusing can be reduced, the amount of movement of the image blur compensating lens unit during image blur compensation is increased, which may result in an increase in the outer diameter of a lens barrel. On the other hand, when the value goes below the lower limit of the condition (1), although the amount of movement of the image blur compensating lens unit can be reduced, the amount of movement of the focusing lens unit is increased, which may result in a difficulty in maintaining short overall length of zoom lens system.

When at least one of the following conditions (1)' and (1)" is satisfied, the above-mentioned effect is achieved more successfully.

$$0.3 < |f_{FR1}/f_W| \quad (1)'$$

$$|f_{FR1}/f_W| < 1.1 \quad (1)''$$

For example, a zoom lens system having the basic configuration like the zoom lens systems according to Embodiments 1 to 3, in which the front unit, in order from the object side to the image side, comprises at least a first lens unit having positive optical power and a second lens unit, preferably satisfies the following condition (2).

$$6.2 < |f_1/f_{FR}| < 7.1 \quad (2)$$

where $f_1$ is a focal length of the first lens unit, and $f_{FR}$ is a composite focal length of the rear unit at a wide-angle limit.

The condition (2) sets forth the ratio of the focal length of a lens unit which is arranged closest to the object side in the zoom lens system and has positive optical power, that is, the first lens unit, to the composite focal length of the subsequent first lens unit and the subsequent second lens unit at a wide-angle limit. When the condition (2) is satisfied, the image blur compensating lens unit and the focusing lens unit can be downsized with maintaining excellent optical performance during image blur compensation at a close-object in-focus condition. When the value exceeds the upper limit of the condition (2), the sensitivity of the image blur compensating lens unit and the focusing lens unit becomes high, which may result in a difficulty in securing precision as to positional control of each lens unit, which is needed during image blur compensation or focusing. On the other hand, when the value goes below the lower limit of the condition (2), the entirety of the zoom lens system needs to be enlarged in order to maintain excellent optical performance.

When at least one of the following conditions (2)' and (2)" is satisfied, the above-mentioned effect is achieved more successfully.

$$6.4 < |f_1/f_{FR}| \quad (2)'$$

$$|f_1/f_{FR}| < 6.9 \quad (2)''$$

For example, a zoom lens system having the basic configuration like the zoom lens systems according to Embodiments 1 to 3 preferably satisfies the following condition (3).

$$0.01 < D_{IF}/f_W < 0.16 \quad (3)$$

where $D_{IF}$ is an axial interval between the image blur compensating lens unit and the focusing lens unit, at a wide-angle limit, in an infinity in-focus condition, and $f_W$ is a focal length of the entire system at a wide-angle limit.

The condition (3) sets forth the ratio of the interval between the image blur compensating lens unit and the focusing lens unit, to the focal length of the entire system, at a wide-angle limit. When the condition (3) is satisfied, the overall length of zoom lens system can be reduced with downsizing the outer diameter of a lens barrel by reducing the amount of movement of the image blur compensating lens unit and the amount of movement of the focusing lens unit. When the value exceeds the upper limit of the condition (3), the overall length of zoom lens system may be increased. On the other hand, when the value goes below the lower limit of the condition (3), spaces for arranging actuators which constitute an image blur compensation system and a focusing system are reduced, which results in a difficulty in realizing desired constructions.

When at least one of the following conditions (3)' and (3)" is satisfied, the above-mentioned effect is achieved more successfully.

$$0.015 < D_{IF}/f_W \quad (3)'$$

$$D_{IF}/f_W < 0.150 \quad (3)''$$

For example, a zoom lens system having the basic configuration like the zoom lens systems according to Embodiments 1 to 3 preferably satisfies the following condition (4).

$$0.1 < f_{FR1P}/f_W < 7.5 \quad (4)$$

where $f_{FR1P}$ is a focal length of the first-P sub lens unit, and $f_W$ is a focal length of the entire system at a wide-angle limit.

The condition (4) sets forth the ratio of the focal length of the first-P sub lens unit to the focal length of the entire system at a wide-angle limit. When the condition (4) is satisfied, the amount of movement of the image blur compensating lens unit is reduced, and the zoom lens system can be downsized. When the value exceeds the upper limit of the condition (4), the amount of movement of the image blur compensating lens unit is increased, which results in a difficulty in reducing the outer diameter of a lens barrel. On the other hand, when the value goes below the lower limit of the condition (4), curvature of field greatly occurs in an over condition, which results in a difficulty in maintaining excellent optical performance.

When at least one of the following conditions (4)' and (4)" is satisfied, the above-mentioned effect is achieved more successfully.

$$0.25 < f_{FR1P}/f_W \quad (4)'$$

$$f_{FR1P}/f_W < 7.30 \quad (4)''$$

The individual lens units constituting the zoom lens system according to each of the embodiments may be each composed exclusively of refractive type lens elements that deflect incident light by refraction (that is, lens elements of a type in which deflection is achieved at the interface between media having different refractive indices). Alternatively the lens units may employ any one of: or a combination of at least two of: diffractive type lens elements that deflect incident light by diffraction; refractive-diffractive hybrid type lens elements that deflect incident light by a combination of diffraction and refraction; and gradient index type lens elements that deflect incident light by distribution of refractive index in the medium.

Embodiment 4

Figure 10:
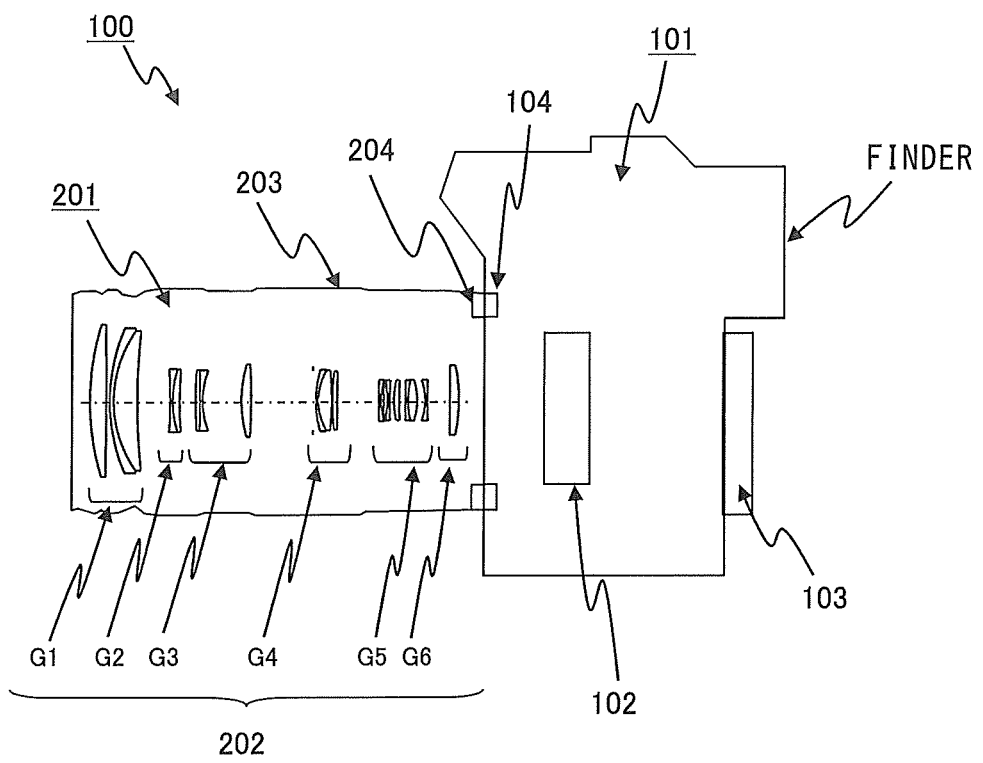
FIG. 10 is a schematic construction diagram of an interchangeable-lens type digital camera system according to Embodiment 4.

FIG. 10 is a schematic construction diagram of an interchangeable-lens type digital camera system according to Embodiment 4.

The interchangeable-lens type digital camera system (referred to simply as "camera system", hereinafter) 100 according to Embodiment 4 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of the above-mentioned Embodiments 1 to 3; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 10, the zoom lens system according to Embodiment 1 is employed as the zoom lens system 202.

In Embodiment 4, the zoom lens system 202 according to any of Embodiments 1 to 3 is employed. Accordingly, a compact interchangeable lens apparatus having excellent imaging performance can be realized at low cost. Moreover, size reduction and cost reduction of the entire camera system 100 according to Embodiment 4 can be achieved.

Numerical examples are described below in which the zoom lens systems according to the embodiments are implemented. As described below, Numerical Examples 1, 2, and 3 correspond to Embodiments 1, 2, and 3, respectively. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

Figure 2:
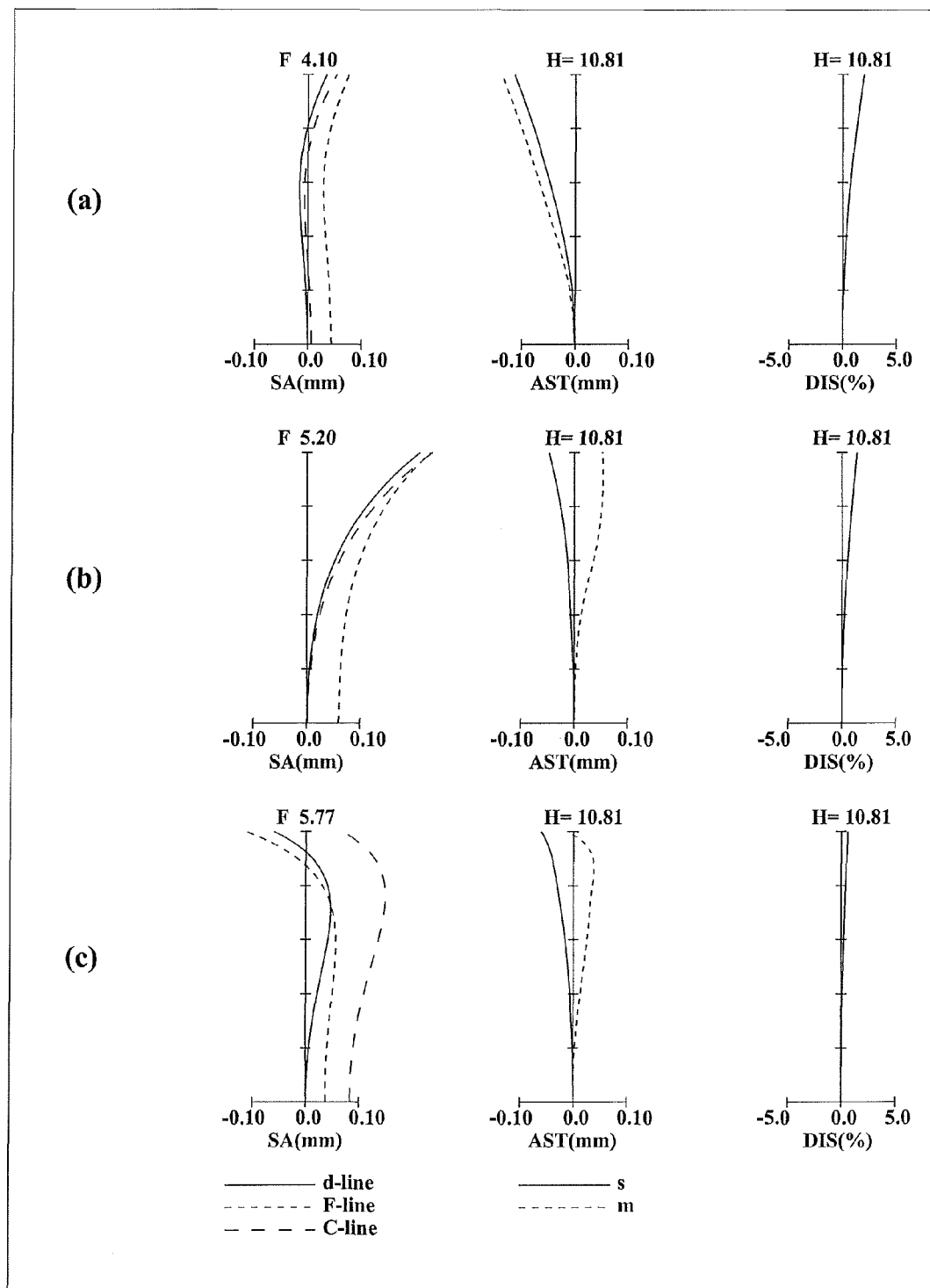
FIG. 2 is a longitudinal aberration diagram of an infinity in-focus condition of a zoom lens system according to Example 1.
Figure 5:
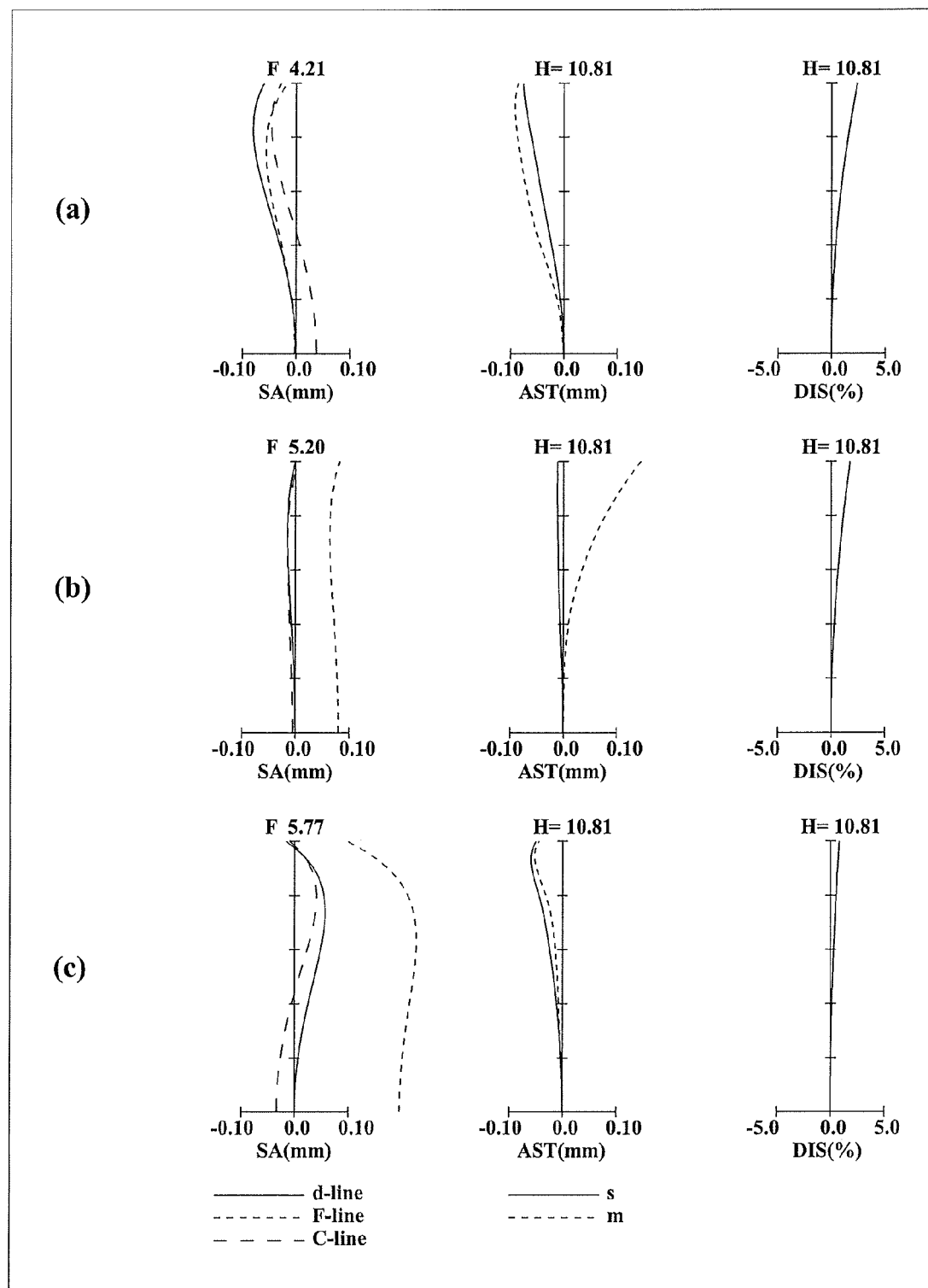
FIG. 5 is a longitudinal aberration diagram showing an infinity in-focus condition of a zoom lens system according to Example 2.
Figure 8:
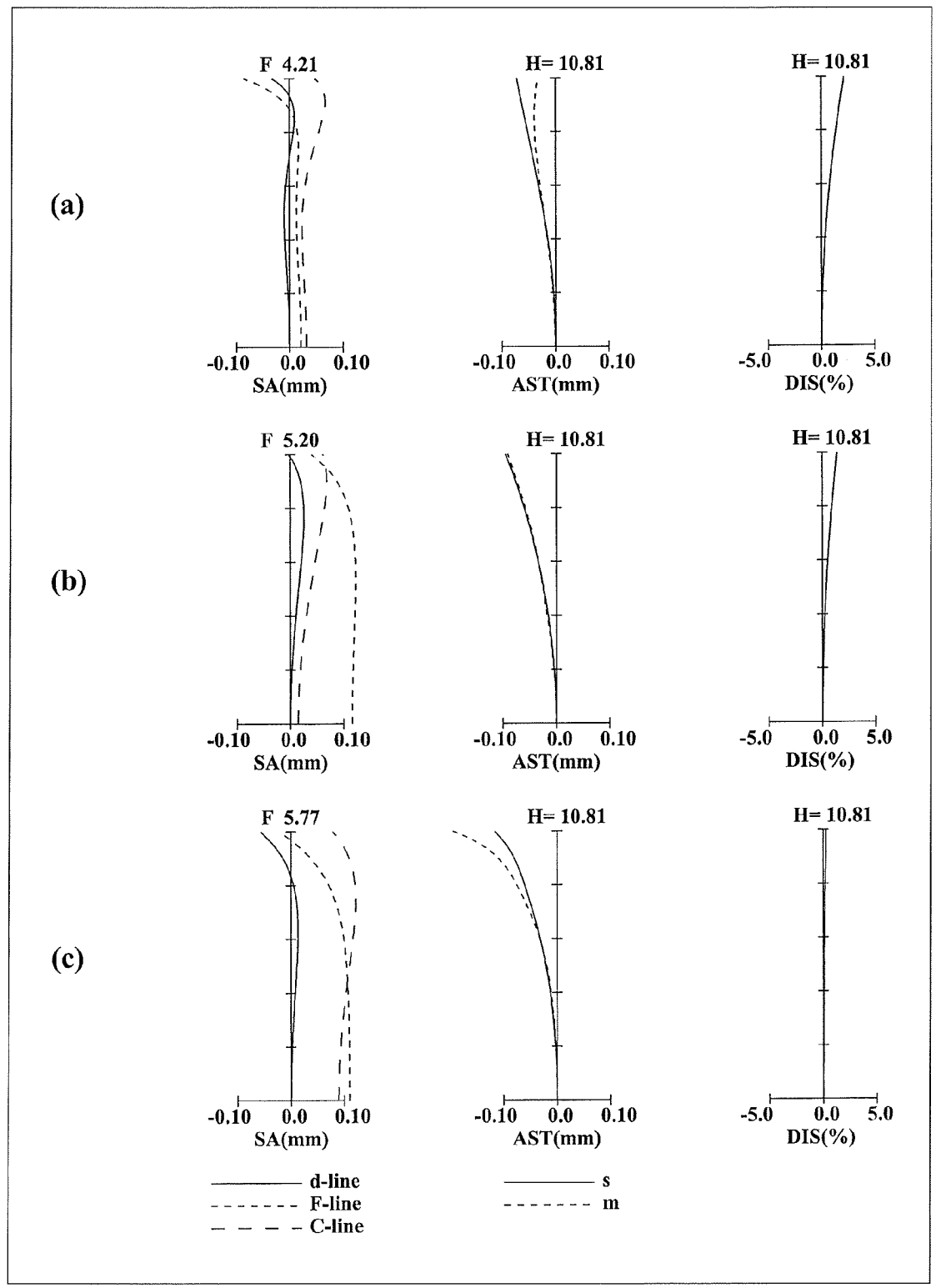
FIG. 8 is a longitudinal aberration diagram showing an infinity in-focus condition of a zoom lens system according to Example 3.

FIGS. 2, 5, and 8 are longitudinal aberration diagrams of an infinity in-focus condition of the zoom lens systems according to Numerical Examples 1, 2, and 3, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Figure, indicated as F), and the solid line, the short dash line and the long dash line indicate the characteristics to the d-line, the F-line and the C-line, respectively. In each astigmatism diagram, the vertical axis indicates the image height (in each Figure, indicated as H), and the solid line and the dash line indicate the characteristics to the sagittal plane (in each Figure, indicated as "s") and the meridional plane (in each Figure, indicated as "m"), respectively. In each distortion diagram, the vertical axis indicates the image height (in each Figure, indicated as H).

Figure 3:
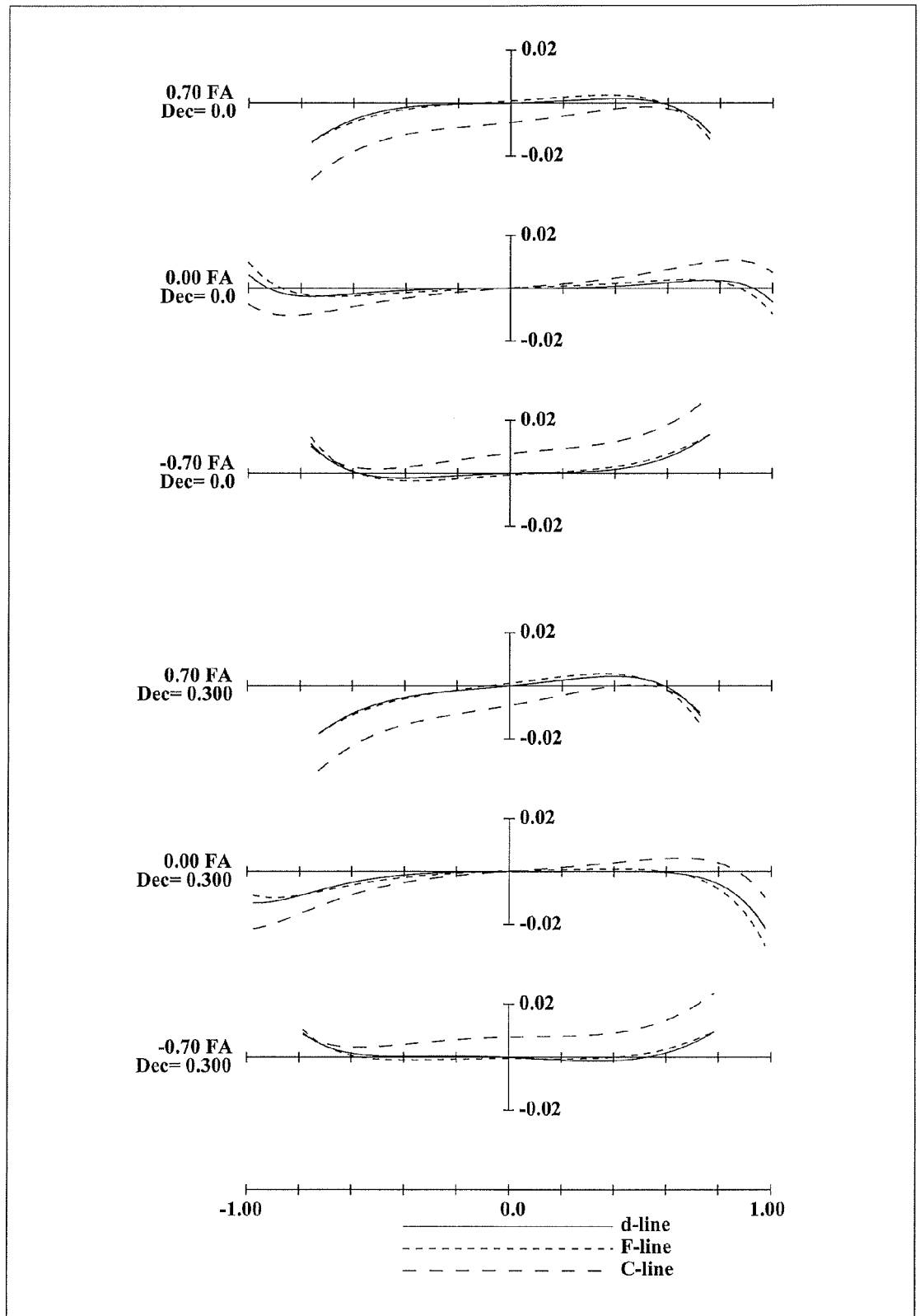
FIG. 3 is a lateral aberration diagram of a zoom lens system according to Example 1 at a telephoto limit in a basic state where image blur compensation is not performed and in an image blur compensation state.
Figure 6:
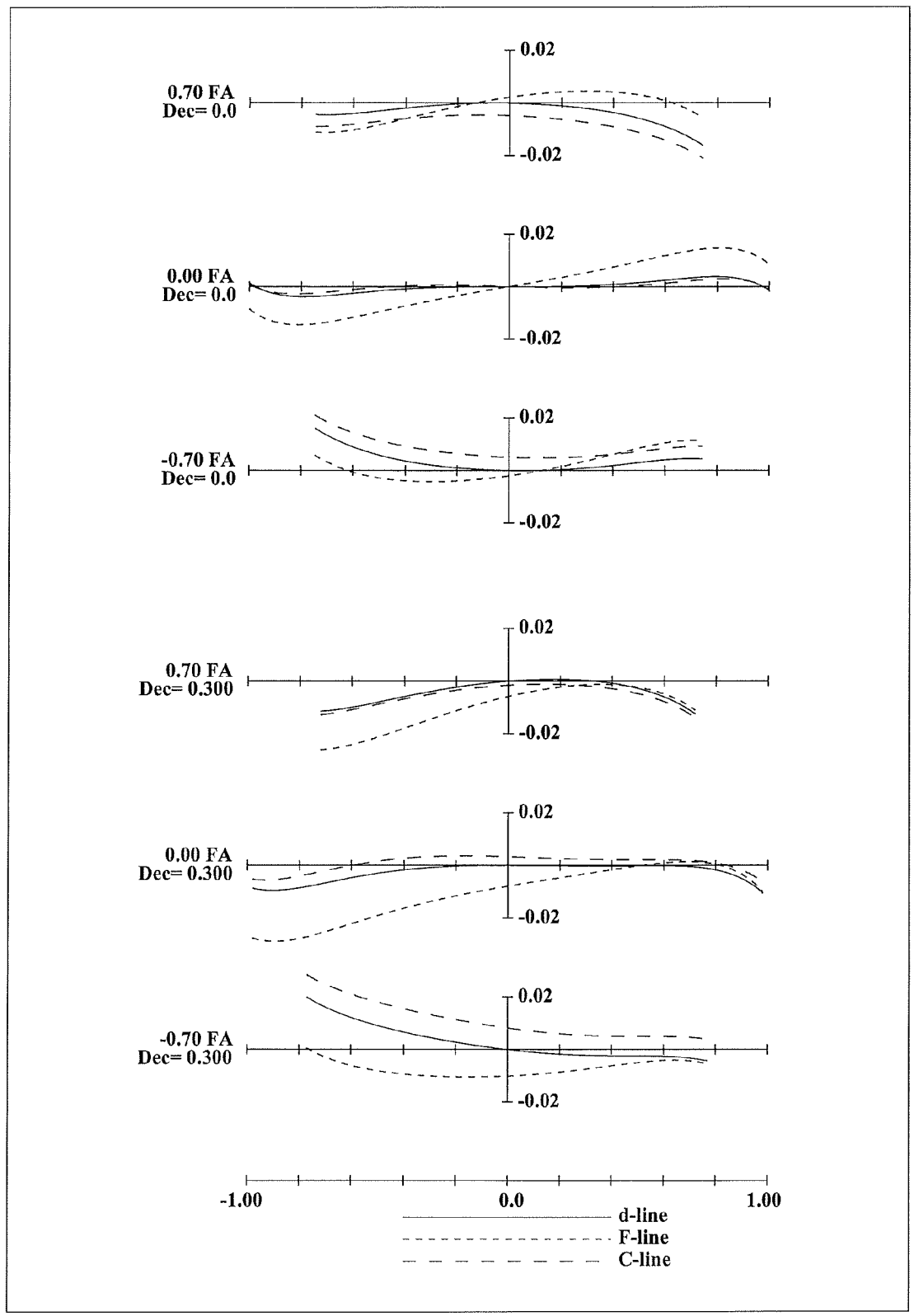
FIG. 6 is a lateral aberration diagram of a zoom lens system according to Example 2 at a telephoto limit in a basic state where image blur compensation is not performed and in an image blur compensation state.
Figure 9:
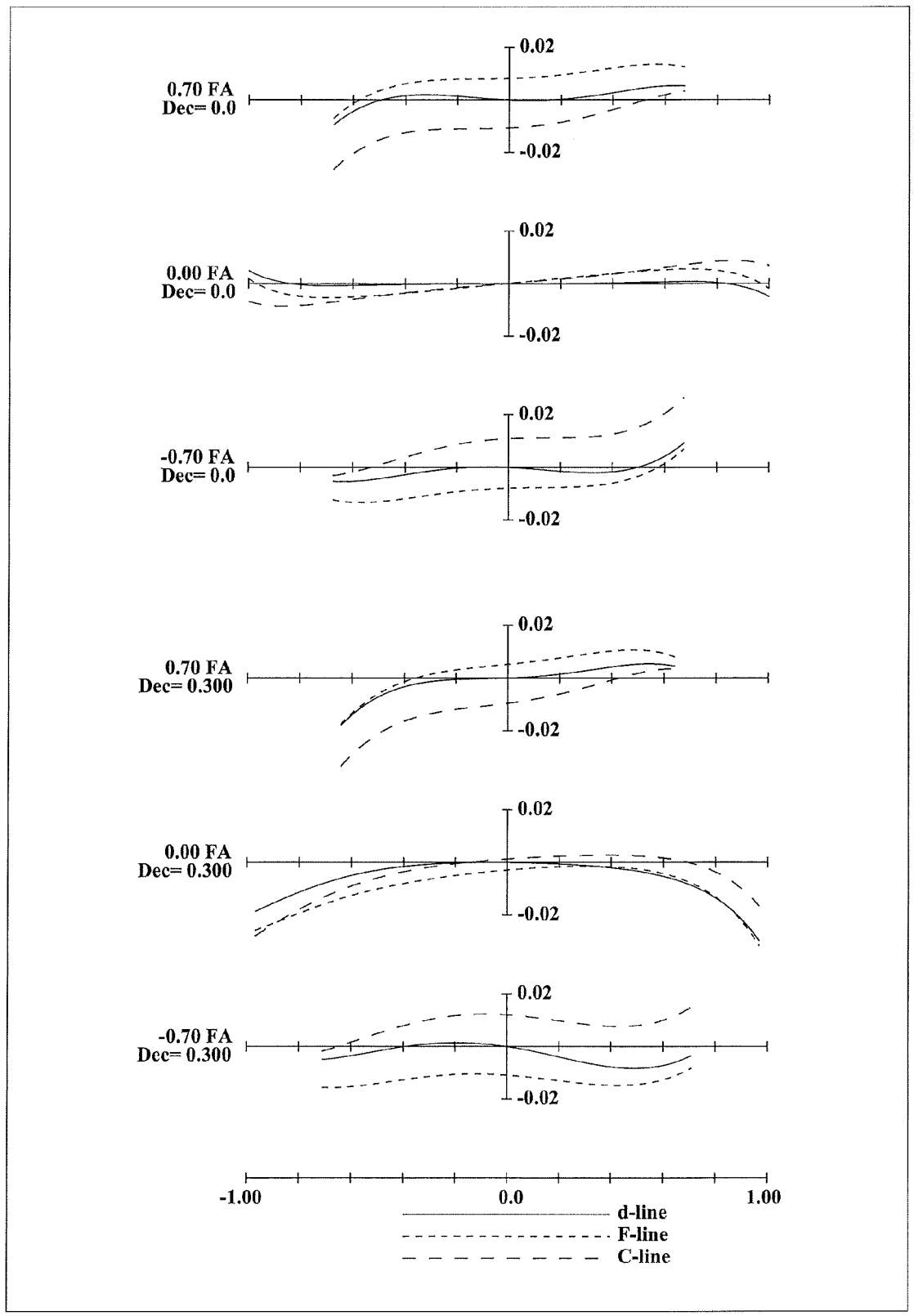
FIG. 9 is a lateral aberration diagram of a zoom lens system according to Example 3 at a telephoto limit in a basic state where image blur compensation is not performed and in an image blur compensation state.

FIGS. 3, 6, and 9 are lateral aberration diagrams of the zoom lens systems according to Numerical Examples 1, 2, and 3, respectively, at a telephoto limit in a basic state where image blur compensation is not performed and in an image blur compensation state.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (the first-N sub lens unit) included in the subsequent first lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1.

In the zoom lens system according to each of the numerical examples, the amount of movement ($Y_T$: mm) of the image blur compensating lens unit in a direction perpendicular to the optical axis in the image blur compensation state at a telephoto limit is as shown in Table 1. The image blur compensation angle is 0.3°. That is, the following amount of movement of the image blur compensating lens unit is equal to the amount of image decentering in a case that the optical axis of the zoom lens system inclines by 0.3°.

TABLE 1

| (Amount of movement of image blur compensating lens unit) | |
|---|---|
| Numerical Example | Amount of movement ($Y_T$: mm) |
| 1 | 0.511 |
| 2 | 0.912 |
| 3 | 0.514 |

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 2 shows the surface data of the zoom lens system of Numerical Example 1. Table 3 shows the various data. Table 4 shows the single lens data. Table 5 shows the zoom lens unit data. Table 6 shows the magnification of zoom lens unit.

TABLE 2

(Surface data)

| Surface number | r | d | nd | vd |
|---|---|---|---|---|
| Object surface | ∞ | | | |
| 1 | 87.86910 | 5.64140 | 1.48749 | 70.4 |
| 2 | −1474.91620 | 1.16040 | | |
| 3 | 62.11310 | 1.30000 | 1.83400 | 37.3 |
| 4 | 41.36780 | 7.94500 | 1.49700 | 81.6 |
| 5 | 203.46370 | Variable | | |
| 6 | −126.16510 | 0.80000 | 1.74000 | 31.7 |
| 7 | 33.29710 | 2.39920 | 1.94595 | 18.0 |
| 8 | 125.52300 | Variable | | |
| 9 | 145.49070 | 1.61040 | 1.68500 | 49.2 |
| 10 | −272.51710 | 0.80010 | 1.66680 | 33.1 |
| 11 | 27.64250 | 13.31430 | | |
| 12 | 42.19520 | 3.36860 | 1.68250 | 44.4 |
| 13 | −203.14900 | Variable | | |
| 14(Diaphragm) | ∞ | 0.98580 | | |
| 15 | 35.67600 | 0.80000 | 1.90681 | 21.2 |
| 16 | 20.02200 | 4.65470 | 1.54250 | 62.9 |
| 17 | −101.42410 | 0.20000 | | |
| 18 | 78.82490 | 1.71450 | 1.64250 | 58.1 |
| 19 | −2496.60910 | Variable | | |
| 20 | ∞ | 0.80000 | 1.91082 | 35.2 |
| 21 | 25.09690 | 0.86920 | | |
| 22 | −289.28960 | 1.13820 | 1.94595 | 18.0 |
| 23 | −39.66560 | 0.80000 | 1.83481 | 42.7 |
| 24 | 126.04190 | 1.49400 | | |
| 25 | 29.75250 | 1.80290 | 1.78590 | 43.9 |
| 26 | 280.89300 | 2.12520 | | |
| 27 | −325.68330 | 0.80010 | 1.91082 | 35.2 |
| 28 | 27.06130 | 3.14680 | 1.64769 | 33.8 |
| 29 | −21.60530 | 2.81770 | | |
| 30 | −18.78080 | 0.80000 | 1.91082 | 35.2 |
| 31 | 308.35180 | Variable | | |
| 32 | ∞ | 3.06490 | 1.94595 | 18.0 |
| 33 | −58.36820 | (BF) | | |
| Image surface | ∞ | | | |

TABLE 3

(Various data)
Zooming ratio 2.82629

| | Wide-angle limit | Middle position | Telephoto limit |
|---|---|---|---|
| Focal length | 102.9396 | 173.1271 | 290.9371 |
| F-number | 4.10028 | 5.20010 | 5.77061 |
| View angle | 5.8815 | 3.5258 | 2.1160 |
| Image height | 10.8150 | 10.8150 | 10.8150 |
| Overall length of lens system | 141.7744 | 166.7451 | 187.1021 |
| BF | 16.01159 | 16.04420 | 16.02348 |
| d5 | 11.1878 | 36.2227 | 56.5340 |
| d8 | 5.5157 | 8.8553 | 6.4361 |
| d13 | 21.0784 | 10.2667 | 2.0018 |
| d19 | 14.1713 | 8.5166 | 1.4697 |
| d31 | 7.4562 | 20.4862 | 38.2836 |
| Entrance pupil | 93.7628 | 210.1606 | 403.3256 |

TABLE 3-continued (Various data)
Zooming ratio 2.82629

| | Wide-angle limit | Middle position | Telephoto limit |
|---|---|---|---|
| position | | | |
| Exit pupil position | −38.9767 | −85.7525 | −324.8658 |
| Front principal points position | 3.9965 | 88.8480 | 445.9580 |
| Back principal points position | 38.8347 | −6.3820 | −103.8350 |

TABLE 4

(Single lens data)

| Lens element | Initial surface number | Focal length |
|---|---|---|
| 1 | 1 | 170.3150 |
| 2 | 3 | −152.8675 |
| 3 | 4 | 102.8047 |
| 4 | 6 | −35.5249 |
| 5 | 7 | 47.3100 |
| 6 | 9 | 138.6869 |
| 7 | 10 | −37.5978 |
| 8 | 12 | 51.4782 |
| 9 | 15 | −51.5736 |
| 10 | 16 | 31.2437 |
| 11 | 18 | 118.9601 |
| 12 | 20 | −27.5542 |
| 13 | 22 | 48.4879 |
| 14 | 23 | −36.0617 |
| 15 | 25 | 42.2097 |
| 16 | 27 | −27.4020 |
| 17 | 28 | 19.0323 |
| 18 | 30 | −19.4132 |
| 19 | 32 | 61.7036 |

TABLE 5

(Zoom lens unit data)

| Lens unit | Initial surface No. | Focal length | Overall length of lens unit | Front principal points position | Back principal points position |
|---|---|---|---|---|---|
| 1 | 1 | 112.15176 | 16.04680 | −0.49017 | 4.80301 |
| 2 | 6 | −138.56834 | 3.19920 | 1.36989 | 2.88302 |
| 3 | 9 | 192.27862 | 19.09340 | 51.50379 | 66.50885 |
| 4 | 14 | 48.32737 | 8.35500 | 3.01023 | 5.60482 |
| 5 | 20 | −17.19742 | 16.59410 | 5.81345 | 12.08001 |
| 6 | 32 | 61.70359 | 3.06490 | 1.57502 | 3.06490 |

TABLE 6

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 2.75933 | 1.84137 | 1.45000 |
| 3 | 9 | 0.50769 | 0.77472 | 0.97912 |
| 4 | 14 | 0.29058 | 0.38422 | 0.51008 |
| 5 | 20 | 3.04494 | 3.80608 | 4.83876 |
| 6 | 32 | 0.74051 | 0.73998 | 0.74032 |

Numerical Example 2

The zoom lens system of Numerical Example 2 corresponds to Embodiment 2 shown in FIG. 4. Table 7 shows the surface data of the zoom lens system of Numerical Example 2. Table 8 shows the various data. Table 9 shows the single lens data. Table 10 shows the zoom lens unit data. Table 11 shows the magnification of zoom lens unit.

TABLE 7

(Surface data)

| Surface number | r | d | nd | vd |
|---|---|---|---|---|
| Object surface | ∞ | | | |
| 1 | 81.96940 | 5.70260 | 1.49700 | 81.6 |
| 2 | ∞ | 1.23620 | | |
| 3 | 65.28570 | 1.30000 | 1.85135 | 40.1 |
| 4 | 42.37910 | 7.94500 | 1.49700 | 81.6 |
| 5 | 222.88530 | Variable | | |
| 6 | −99.74180 | 0.80000 | 1.74950 | 35.0 |
| 7 | 38.00000 | 5.30140 | 1.94595 | 18.0 |
| 8 | 158.02250 | Variable | | |
| 9 | 156.86110 | 2.16100 | 1.67790 | 53.4 |
| 10 | −64.83070 | 1.35930 | | |
| 11 | −62.10050 | 0.85670 | 1.66680 | 33.1 |
| 12 | 31.69600 | Variable | | |
| 13 | 45.94270 | 3.08940 | 1.71300 | 53.9 |
| 14 | −326.07940 | Variable | | |
| 15(Diaphragm) | ∞ | 0.20000 | | |
| 16 | 38.63140 | 0.80000 | 1.84400 | 24.8 |
| 17 | 20.65840 | 5.10790 | 1.56384 | 60.8 |
| 18 | −92.02870 | 0.20000 | | |
| 19 | 63.54430 | 1.53010 | 1.83400 | 37.3 |
| 20 | 141.29540 | Variable | | |
| 21 | 212.90190 | 0.83660 | 1.92286 | 20.9 |
| 22 | 309.28800 | 1.49940 | | |
| 23 | ∞ | 0.80000 | 1.91082 | 35.2 |
| 24 | 30.08660 | 0.70740 | | |
| 25 | 361.51790 | 1.28610 | 1.94595 | 18.0 |
| 26 | −59.83240 | 0.20000 | | |
| 27 | −47.69660 | 1.34920 | 1.91082 | 35.2 |
| 28 | −161.39320 | Variable | | |
| 29 | 84.10880 | 0.80000 | 1.91082 | 35.2 |
| 30 | 21.37910 | 3.05940 | 1.64831 | 33.8 |
| 31 | −23.56930 | 1.28990 | | |
| 32 | −22.55280 | 1.70910 | 1.91082 | 35.2 |
| 33 | 56.48280 | Variable | | |
| 34 | 391.81150 | 6.00000 | 1.84666 | 23.9 |
| 35 | −55.38250 | (BF) | | |
| Image surface | ∞ | | | |

TABLE 8

(Various data)
Zooming ratio 2.82285

| | Wide-angle limit | Middle position | Telephoto limit |
|---|---|---|---|
| Focal length | 103.0633 | 173.1262 | 290.9321 |
| F-number | 4.21382 | 5.20034 | 5.77016 |
| View angle | 5.8529 | 3.5139 | 2.1119 |
| Image height | 10.8150 | 10.8150 | 10.8150 |
| Overall length of lens system | 144.0794 | 170.7015 | 194.3387 |
| BF | 16.38450 | 16.37607 | 16.36829 |
| d5 | 6.0139 | 32.7026 | 56.4520 |
| d8 | 6.7792 | 7.0703 | 4.6603 |
| d12 | 12.6197 | 14.0183 | 16.1156 |
| d14 | 19.9259 | 8.4175 | 1.4945 |
| d20 | 14.2471 | 7.6637 | 0.7938 |
| d28 | 2.1908 | 5.3654 | 1.9895 |
| d33 | 8.7916 | 21.9609 | 39.3380 |
| Entrance pupil position | 85.0150 | 183.5912 | 424.5809 |
| Exit pupil position | −45.0268 | −114.5479 | −604.7548 |
| Front principal points position | 15.1128 | 127.7855 | 579.2413 |
| Back principal points position | 41.0161 | −2.4247 | −96.5934 |

TABLE 9

(Single lens data)

| Lens element | Initial surface number | Focal length |
|---|---|---|
| 1 | 1 | 164.9293 |
| 2 | 3 | −145.6755 |
| 3 | 4 | 103.7735 |
| 4 | 6 | −36.6222 |
| 5 | 7 | 51.7783 |
| 6 | 9 | 67.9355 |
| 7 | 11 | −31.3571 |
| 8 | 13 | 56.6742 |
| 9 | 16 | −53.7048 |
| 10 | 17 | 30.4191 |
| 11 | 19 | 137.2342 |
| 12 | 21 | 737.2031 |
| 13 | 23 | −33.0323 |
| 14 | 25 | 54.3503 |
| 15 | 27 | −74.7575 |
| 16 | 29 | −31.6644 |
| 17 | 30 | 17.7675 |
| 18 | 32 | −17.5148 |
| 19 | 34 | 57.6667 |

TABLE 10

(Zoom lens unit data)

| Lens unit | Initial surface No. | Focal length | Overall length of lens unit | Front principal points position | Back principal points position |
|---|---|---|---|---|---|
| 1 | 1 | 114.90049 | 16.18380 | −0.71362 | 4.62928 |
| 2 | 6 | −119.45015 | 6.10140 | 1.98802 | 4.93369 |
| 3 | 9 | −61.74307 | 4.37700 | 5.00355 | 6.09115 |
| 4 | 13 | 56.67420 | 3.08940 | 0.22350 | 1.50314 |
| 5 | 15 | 46.76847 | 7.83800 | 2.09867 | 4.92518 |
| 6 | 21 | −42.37981 | 6.67870 | 2.28246 | 4.30698 |
| 7 | 29 | −34.92877 | 6.85840 | 5.43900 | 7.69768 |
| 8 | 34 | 57.66669 | 6.00000 | 2.86435 | 5.59513 |

TABLE 11

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 4.95519 | 2.35162 | 1.60241 |
| 3 | 9 | −0.15523 | −0.71407 | 100.06942 |
| 4 | 13 | −2.19819 | −0.91877 | 0.00920 |
| 5 | 15 | 0.22879 | 0.32612 | 0.47849 |
| 6 | 21 | 1.64556 | 1.78650 | 1.76740 |
| 7 | 29 | 1.98778 | 2.36433 | 2.86139 |
| 8 | 34 | 0.70885 | 0.70900 | 0.70914 |

Numerical Example 3

The zoom lens system of Numerical Example 3 corresponds to Embodiment 3 shown in FIG. 7. Table 12 shows the surface data of the zoom lens system of Numerical Example 3. Table 13 shows the various data. Table 14 shows the single lens data. Table 15 shows the zoom lens unit data. Table 16 shows the magnification of zoom lens unit.

TABLE 12

(Surface data)

| Surface number | r | d | nd | vd |
|---|---|---|---|---|
| Object surface | ∞ | | | |
| 1 | 98.26860 | 5.38970 | 1.48749 | 70.4 |
| 2 | −804.92740 | 0.29590 | | |
| 3 | 60.52310 | 1.30000 | 1.88202 | 37.2 |
| 4 | 42.33030 | 7.94500 | 1.49700 | 81.6 |
| 5 | 253.68420 | Variable | | |
| 6 | −119.87650 | 0.80000 | 1.72825 | 28.3 |
| 7 | 33.16770 | 1.26450 | | |
| 8 | 36.92200 | 4.14620 | 1.94595 | 18.0 |
| 9 | 329.33030 | Variable | | |
| 10 | −801.43510 | 0.80020 | 1.67791 | 55.5 |
| 11 | 29.31790 | 9.16030 | | |
| 12 | 35.10390 | 4.99740 | 1.68248 | 48.2 |
| 13 | −230.67440 | Variable | | |
| 14 | 37.33590 | 0.85850 | 1.94595 | 18.0 |
| 15 | 19.97390 | 2.53900 | | |
| 16 | 156.34870 | 2.25610 | 1.59240 | 68.4 |
| 17 | −256.95390 | 0.35620 | | |
| 18 | 22.74140 | 5.48500 | 1.54250 | 62.9 |
| 19 | −51.25900 | Variable | | |
| 20(Diaphragm) | ∞ | 1.48660 | | |
| 21 | 186.36160 | 0.80000 | 1.91082 | 35.2 |
| 22 | 23.63780 | 2.23670 | | |
| 23 | −49.82820 | 1.05860 | 1.94595 | 18.0 |
| 24 | −24.98040 | 0.80000 | 1.85030 | 32.2 |
| 25 | −131.71400 | 2.67200 | | |
| 26 | 36.56610 | 2.83780 | 1.75670 | 36.3 |
| 27 | −133.30800 | Variable | | |
| 28 | −167.48070 | 0.80010 | 1.91082 | 35.2 |
| 29 | 23.53320 | 2.56220 | 1.64831 | 33.8 |
| 30 | −22.33700 | 3.77870 | | |
| 31 | −18.74390 | 0.80050 | 1.91082 | 35.2 |
| 32 | 246.08600 | Variable | | |
| 33 | −1055.73170 | 5.26480 | 1.94595 | 18.0 |
| 34 | −50.11500 | (BF) | | |
| Image surface | ∞ | | | |

TABLE 13

(Various data)
Zooming ratio 2.82489

| | Wide-angle limit | Middle position | Telephoto limit |
|---|---|---|---|
| Focal length | 102.9898 | 173.1271 | 290.9352 |
| F-number | 4.21434 | 5.20002 | 5.77048 |
| View angle | 5.8727 | 3.5265 | 2.1227 |
| Image height | 10.8150 | 10.8150 | 10.8150 |
| Overall length of lens system | 142.8956 | 167.5002 | 188.1054 |
| BF | 14.20643 | 14.23461 | 14.22276 |
| d5 | 8.0933 | 32.7338 | 53.3340 |
| d9 | 5.9925 | 1.9310 | 6.5429 |
| d13 | 15.2912 | 13.4249 | 1.5006 |
| d19 | 11.8476 | 8.8075 | 1.4568 |
| d27 | 8.6848 | 1.6182 | 1.5967 |
| d32 | 6.0878 | 22.0582 | 36.7596 |
| Entrance pupil position | 115.6088 | 237.3693 | 445.1504 |
| Exit pupil position | −36.0160 | −100.9390 | −564.1985 |
| Front principal points position | 7.4003 | 150.2546 | 589.7505 |
| Back principal points position | 39.9059 | −5.6269 | −102.8298 |

TABLE 14

(Single lens data)

| Lens element | Initial surface number | Focal length |
|---|---|---|
| 1 | 1 | 180.0008 |
| 2 | 3 | −165.1909 |
| 3 | 4 | 100.9704 |
| 4 | 6 | −35.5955 |
| 5 | 8 | 43.6594 |
| 6 | 10 | −41.7051 |
| 7 | 12 | 44.9853 |
| 8 | 14 | −46.5254 |
| 9 | 16 | 164.4182 |
| 10 | 18 | 29.8146 |
| 11 | 21 | −29.7918 |
| 12 | 23 | 51.8822 |
| 13 | 24 | −36.3795 |
| 14 | 26 | 38.1961 |
| 15 | 28 | −22.6090 |
| 16 | 29 | 18.0735 |
| 17 | 31 | −19.0950 |
| 18 | 33 | 55.4778 |

TABLE 15

(Zoom lens unit data)

| Lens unit | Initial surface No. | Focal length | Overall length of lens unit | Front principal points position | Back principal points position |
|---|---|---|---|---|---|
| 1 | 1 | 107.85872 | 14.93060 | −0.15256 | 5.01059 |
| 2 | 6 | −223.07827 | 6.21070 | −5.24540 | −3.05005 |
| 3 | 10 | 298.16034 | 14.95790 | 63.90565 | 80.79595 |
| 4 | 14 | 46.51208 | 11.49480 | 9.30844 | 13.17664 |
| 5 | 20 | −103.33378 | 11.89170 | −13.86038 | −15.44545 |
| 6 | 28 | −26.32686 | 7.94150 | 6.31351 | 8.13827 |
| 7 | 33 | 55.47778 | 5.26480 | 2.83314 | 5.39929 |

TABLE 16

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 1.74297 | 1.46158 | 1.28777 |
| 3 | 10 | 0.77496 | 0.91451 | 1.05489 |
| 4 | 14 | 0.30037 | 0.40408 | 0.54607 |
| 5 | 20 | 1.54004 | 1.50016 | 1.51660 |
| 6 | 28 | 2.04754 | 2.65609 | 3.21370 |
| 7 | 33 | 0.74635 | 0.74584 | 0.74606 |

The following Table 17 shows the corresponding values to the individual conditions in the zoom lens systems of each of Numerical Examples.

TABLE 17

(Values corresponding to conditions)

| | Numerical Example | | |
|---|---|---|---|
| Condition | 1 | 2 | 3 |
| (1) $|f_{FR1}/f_W|$ | 0.57 | 0.41 | 1.00 |
| (2) $|f_1/f_{FR}|$ | 6.52 | 6.78 | 6.82 |
| (3) $D_{IF}/f_W$ | 0.05 | 0.02 | 0.14 |
| (4) $f_{FR1P}/f_W$ | 0.41 | 7.15 | 0.37 |

The zoom lens system according to the present invention is applicable to a digital still camera, a digital video camera, a camera for a mobile telephone, a camera for a PDA (Personal Digital Assistance), a surveillance camera in a surveillance system, a Web camera, a vehicle-mounted camera or the like. In particular, the zoom lens system according to the present invention is suitable for a photographing optical system where high image quality is required like in a digital still camera system or a digital video camera system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system having a plurality of lens units, each lens unit being composed of at least one lens element, the zoom lens system, in order from an object side to an image side, comprising:
a front unit; and
a rear unit, wherein
the rear unit, in order from the object side to the image side, comprises:
a subsequent first lens unit; and
a subsequent second lens unit having negative optical power and being a focusing lens unit which moves along an optical axis at the time of focusing from an infinity in-focus condition to a close-object in-focus condition,
the subsequent first lens unit comprises:
a first-N sub lens unit having negative optical power; and
a first-P sub lens unit having positive optical power, and
the first-N sub lens unit or the first-P sub lens unit is an image blur compensating lens unit which moves in a direction perpendicular to the optical axis in order to optically compensate image blur.

2. The zoom lens system as claimed in claim 1, wherein the following condition (1) is satisfied:

$$0.2 < |f_{FR1}/f_W| < 1.2 \quad (1)$$

where
$f_{FR1}$ is a focal length of the subsequent first lens unit, and
$f_W$ is a focal length of the entire system at a wide-angle limit.

3. The zoom lens system as claimed in claim 1, wherein the front unit, in order from the object side to the image side, comprises at least a first lens unit having positive optical power and a second lens unit, and
the following condition (2) is satisfied:

$$6.2 < |f_1/f_{FR}| < 7.1 \quad (2)$$

where
$f_1$ is a focal length of the first lens unit of the front unit, and
$f_{FR}$ is a composite focal length of the rear unit at a wide-angle limit.

4. The zoom lens system as claimed in claim 3, wherein the second lens unit of the front unit is fixed relative to an image surface at the time of zooming from a wide-angle limit to a telephoto limit.

5. The zoom lens system as claimed in claim 1, wherein the following condition (3) is satisfied:

$$0.01 < D_{IF}/f_W < 0.16 \quad (3)$$

where
$D_{IF}$ is an axial interval between the image blur compensating lens unit and the focusing lens unit, at a wide-angle limit, in an infinity in-focus condition, and
$f_W$ is a focal length of the entire system at a wide-angle limit.

6. The zoom lens system as claimed in claim 1, wherein the following condition (4) is satisfied:

$$0.01 < f_{FR1P}/f_W < 7.5 \quad (4)$$

where
$f_{FR1P}$ is a focal length of the first-P sub lens unit, and
$f_W$ is a focal length of the entire system at a wide-angle limit.

7. The zoom lens system as claimed in claim 1, wherein the rear unit further comprises an aperture diaphragm, and the focusing lens unit is arranged on the image side relative to the aperture diaphragm.

8. The zoom lens system as claimed in claim 1, wherein the rear unit further comprises an aperture diaphragm, and the image blur compensating lens unit is arranged on the image side relative to the aperture diaphragm.

9. The zoom lens system as claimed in claim 1, wherein the image blur compensating lens unit is the first-N sub lens unit having negative optical power.

10. The zoom lens system as claimed in claim 1, wherein at least one lens unit having positive optical power is arranged on the image side relative to the focusing lens unit.

11. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

12. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *